United States Patent
Deissler

[11] Patent Number: 5,955,120
[45] Date of Patent: Sep. 21, 1999

[54] HEATING DEVICE, IN PARTICULAR FOR USE IN INJECTION MOLDS FOR THE PROCESSING OF THERMOPLASTIC MATERIALS

[75] Inventor: Klaus Deissler, Ellhofen, Germany

[73] Assignee: DME Normalien GmbH, Germany

[21] Appl. No.: 08/902,598

[22] Filed: Sep. 3, 1996

Related U.S. Application Data

[63] Continuation of application No. PCT/DE95/00226, Feb. 23, 1995.

[30] Foreign Application Priority Data

Mar. 1, 1994 [DE] Germany .......................... 94 03 416 U
Jun. 2, 1994 [EP] European Pat. Off. .............. 94108494

[51] Int. Cl.⁶ .................................................. B29C 45/20
[52] U.S. Cl. ........................................... 425/547; 425/549
[58] Field of Search ..................................... 425/547, 549

[56] References Cited

U.S. PATENT DOCUMENTS

| | | | |
|---|---|---|---|
| 4,922,082 | 5/1990 | Bredt et al. ............................. | 425/549 |
| 5,360,333 | 11/1994 | Schmidt ................................... | 425/549 |
| 5,411,392 | 5/1995 | Von Buren .............................. | 425/549 |
| 5,834,041 | 11/1998 | Sekine et al. ........................... | 425/549 |
| 5,851,571 | 12/1998 | Manner .................................... | 425/549 |

FOREIGN PATENT DOCUMENTS

| | | |
|---|---|---|
| 0 165 729 | 12/1985 | European Pat. Off. . |
| 0 468 483 A2 | 1/1992 | European Pat. Off. . |
| 28 21 736 A1 | 5/1978 | Germany . |
| 30 01 017 A1 | 1/1980 | Germany . |

OTHER PUBLICATIONS

Patent Abstracts of Japan, vol. 6, No. 142, (M–146) [1020] Jul. 31, 1982, & JP, A, 57 062848 (Toshiba Kikai) Apr. 16, 1982.

Patent Abstracts of Japan, vol. 9, No. 294 (M–431) [2017], Nov. 20, 1985, & JP, A, 60 132 724 (Fanuc K.K.) Jul. 15, 1985.

*Primary Examiner*—Tim Heitbrink
*Attorney, Agent, or Firm*—Stephen H. Friskney

[57] ABSTRACT

A heating device for use in injection molding includes an insulating device that has a wear resistant layer of titanium or a titanium alloy to provide a relatively low coefficient of thermal conductivity; and an insulating layer of mica. The wear resistant layer to be arranged on the inside and/or outside of the insulating layer. Whether the wear resistant layer is arranged on the outside, inside, or both outside and inside, depends on the respective field of application. By the use of the materials titanium/titanium alloy and mica, a heating device with good insulation values can be produced in a very compact construction. Because of its high wear resistance, the heating device will also have a long service life.

8 Claims, 3 Drawing Sheets

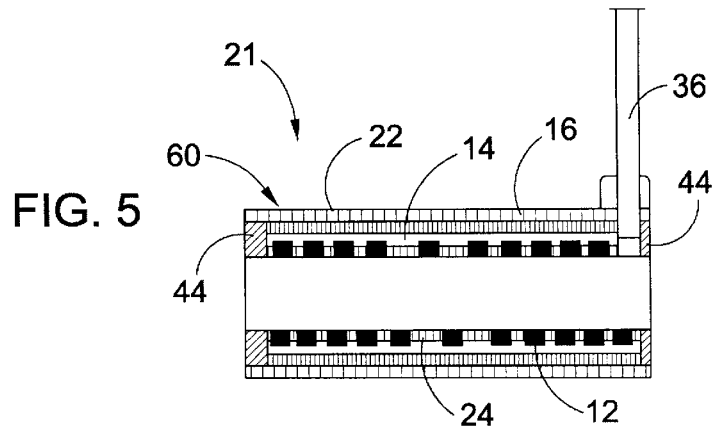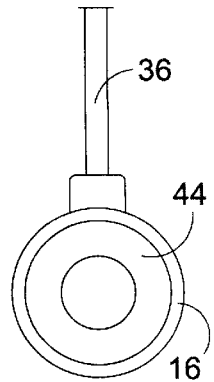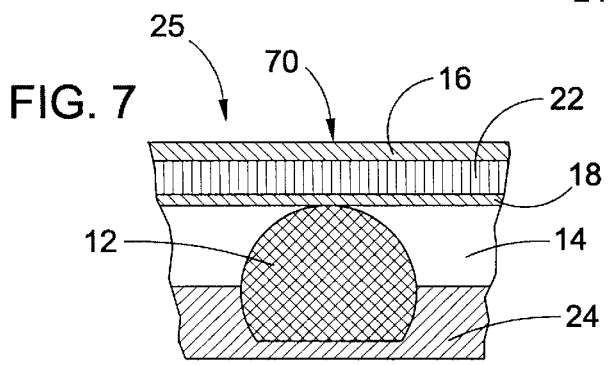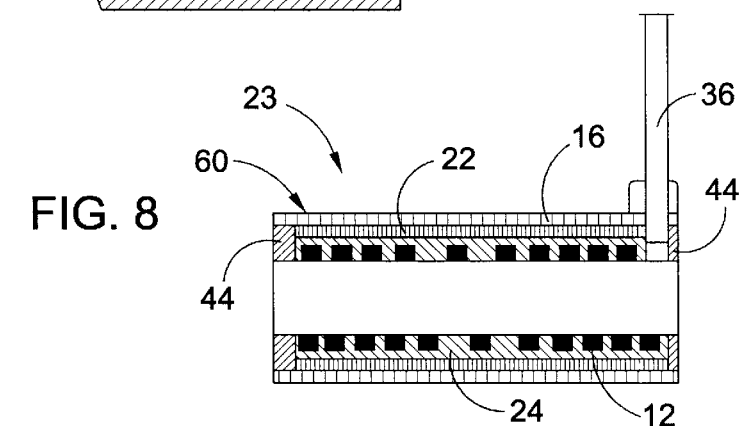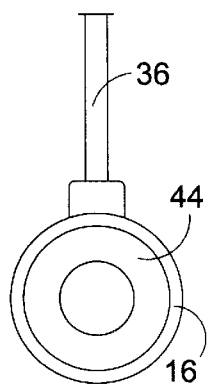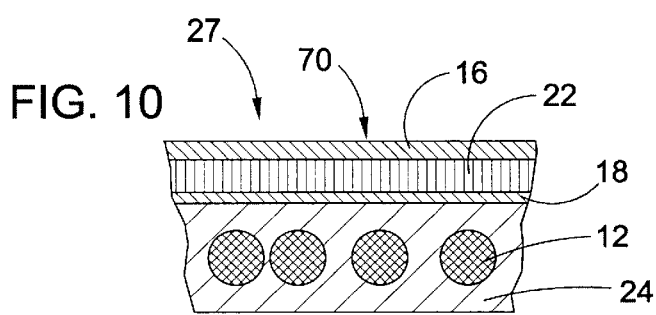

HEATING DEVICE, IN PARTICULAR FOR USE IN INJECTION MOLDS FOR THE PROCESSING OF THERMOPLASTIC MATERIALS

This is a 371 of international application Ser. No. PCT/DE95/00226, filed Feb. 23, 1995.

FIELD OF THE INVENTION

The present invention relates to a heating device, in particular, a heating device for use in injection molds for the processing of thermoplastic materials. The heating device preferably includes a housing substantially in the form of a hollow profile and a heating unit, preferably a heating coil, which is associated with the housing and is adapted to receive a heating current.

Such heating devices are used as so-called tubular heating cartridges or heating bands in order, for example, to bring runners of mold gating devices (hot runner nozzles and manifolds) to a predetermined temperature or to keep them at a predetermined temperature in order to ensure that a constant flow of the thermoplastic material is kept within the desired melt flow temperature range.

In addition, such heating devices are used in conjunction with heat conducting pipes, which serve to control the temperature of molding zones or hot runner nozzles and hot runner manifold blocks.

BACKGROUND OF THE INVENTION

Heating devices in which the heating coil is covered with cast copper or brass are known. These cast heating cartridges typically have an external casing of stainless steel, but have the disadvantage of relatively great heat dissipation through the casing's outer surface. As a result, adjacent components which actually do not need any heating are heated, which has a detrimental effect when considering the overall energy balance.

A typical prior art heating device is disclosed in EP-A-0468483. This reference describes a heating device for a hot runner nozzle, which is surrounded alternately by a plurality of layers of stainless steel and ceramic insulating material. The layers may be provided in different thicknesses. Such a heating device is relatively complex to produce and is not optimal with regard to its insulating effect.

SUMMARY OF THE INVENTION

An object of the present invention is to provide an improved heating device that ensures optimum heating properties at the points at which the thermal energy or heating energy i8 required, has a simple structure and consequently ensures efficient fabrication and, in addition, can be used reliably in continuous operation.

It is a further object of the present invention to provide a heating device that has a compact structure and is consequently of a small design.

A further object is to provide a reliably operating gating device or nozzle device, which is of a small design and dissipates as little heat as possible to its surroundings.

The heating device according to the invention is distinguished from the prior art in that it includes an insulating device that preferably has the following elements of construction: a wear resistant layer with relatively low coefficient of thermal conductivity, of titanium or a titanium alloy; and an insulating layer of mica, it being possible for the wear resistant layer to be arranged on the inside and/or outside of the insulating layer. Whether the wear resistant layer is arranged on the outside or inside or outside and inside depends on the respective field of application. By the use of the materials titanium/titanium alloy and mica, a heating device of a very compact construction, which has very good insulation values and, on account of its high wear resistance, a long service life can be produced.

It is ensured by the heating device according to the invention that the heat is supplied to a greater extent to the areas where it is needed. If the insulating device is arranged on the outside, the heating device is preferably suitable for use for the encasing of a valve pin of a gating device, since in this case the heat is supplied predominantly inwards to the nozzle runner in order to keep the thermoplastic material flowing therein at a predetermined temperature.

In addition, the heating devices according to the invention can in the same advantageous way be applied to heat conducting pipes.

In the case of an inner arrangement of the insulating device, the heating device according to the invention is preferably used as a heating band for outer heating. Conversely, in the case of an arrangement of the insulating layer on the outside, the heating device may be used as a heating band for inner heating.

By the use of the-said insulating materials, a very good thermal insulation can be accomplished.

For the purpose of simple, low-cost production of the complete heating device it has proved to be favorable, depending on the application, to form the insulating device such that, when producing the heating device, it can either be applied to the housing on the outside or can be inserted into the housing on the inside. In a further variant, the housing itself forms the insulating device. It is also possible for the insulating device to be used as a form for the casting of the heating coil with thermally conducting material, which allows particularly low-cost fabrication.

With regard to a good heat transfer from the heating coil to the component to be heated, it is advantageous to cast the heating coil, at least in certain regions, with a material which conducts heat very well (for example copper, copper alloy, brass, etc).

A preferred refinement is distinguished in that the heating unit (heating coil) is cast in certain regions in such a way that the heating coil itself still protrudes in certain regions out of the cast region and that, with the insulating device resting on the protrusion, there is additionally an insulating layer of air between the casting compound and the insulating device.

An injection mold with a hot runner for the processing of thermoplastic materials according to the invention is characterized in that there is arranged at least one heating device according to the invention.

A gating device (hot runner) according to the invention for an injection mold for the processing of thermoplastic material is distinguished in that the gating device has at least one heating device according to the invention integrated into the construction.

With the heating device according to the invention, energy savings of up to 50% and more in comparison with the previous known heating devices can be accomplished. Furthermore, it is possible to achieve compact dimensions, since the dimensions for the heating unit itself can be kept smaller because of the improved supply of heat to the points at which the heat is required. The temperature of the mold itself is reduced.

Further embodiments and advantages of the invention are obtained from the features and exemplary embodiments specified in the detailed description given below. The features of the invention can be combined with one another in any desired way, provided that they are not obviously mutually exclusive.

BRIEF DESCRIPTION OF THE DRAWING

The invention and advantageous embodiments and developments of the same are described in more detail and explained below with reference to the examples represented in the drawing. The features disclosed by the description and the drawing can be used according to the invention individually on their own or together in any desired combination. In the drawing:

FIG. 5 shows a diagrammatic section through a heating cartridge with a layered insulating device according to a first exemplary embodiment, FIG. 6 shows an end view of the heating cartridge according to FIG. 5, FIG. 7 shows a detail from the wall of a heating cartridge with a layered insulating device according to a second exemplary embodiment, FIG. 8 shows a diagrammatic longitudinal section through a heating cartridge with a layered insulating device according to a third exemplary embodiment, FIG. 9 shows an end view of the heating cartridge according to FIG. 8, FIG. 10 shows a detail from the wall of a heating cartridge with a layered insulating device according to a fourth exemplary embodiment.

DETAILED DESCRIPTION OF THE INVENTION

Figure 1:
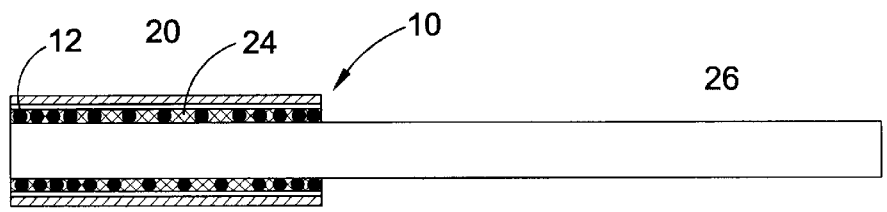
FIG. 1 shows a diagrammatic sectional representation of a heating device with insulating device for a heat conducting pipe.

According to FIG. 1, there is shown a heat conducting pipe 26, which serves in particular for controlling the temperature of molding zones (not shown). A heating device 10 is mounted on the outer circumference of the heat conducting pipe 26. The heating device 10 itself has, from inside to outside, a first cast layer 24 of brass, inside which there is cast a heating unit or heating coil 12. On the outside, an insulating device 20 surrounds the cast unit 24. Since an increased heating capacity is required near the ends, the axial spacing of the turns of the heating coil 12 is reduced in these regions.

Figure 2:
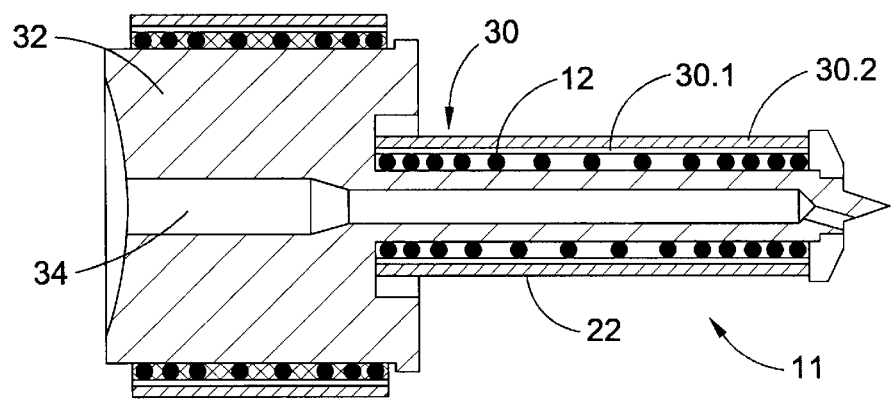
FIG. 2 shows a diagrammatic sectional representation of a heating device with an insulating device for a nozzle device.

The heating device 11 diagrammatically represented in FIG. 2 is applied to the outer circumference of the' nozzle runner 34 of a nozzle device 32'. It has a structure similar to the heating device 10 according to FIG. 1, but in addition to a first insulating layer 30.1 there is on the outside a second insulating layer 30.2. The first insulating layer 30.1 may be made from ceramic or mica. The second insulating layer 30.2 is at the same time formed as a wear resistant layer and consists of a titanium alloy with a low coefficient of thermal conductivity.

Figure 3:
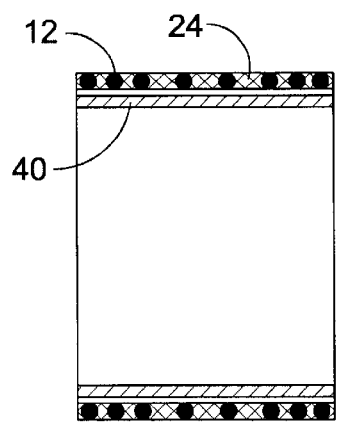
FIG. 3 shows a diagrammatic section through a heating band with an insulating device for outer heating.

Represented diagrammatically in FIG. 3 is a heating band 13, which is used for outer heating. In this case, the heating unit 12 is arranged with its cast layer 24 on the outside. Adjoining on the inside there is an insulating device 40 formed in the manner of an insulating layer.

Figure 4:
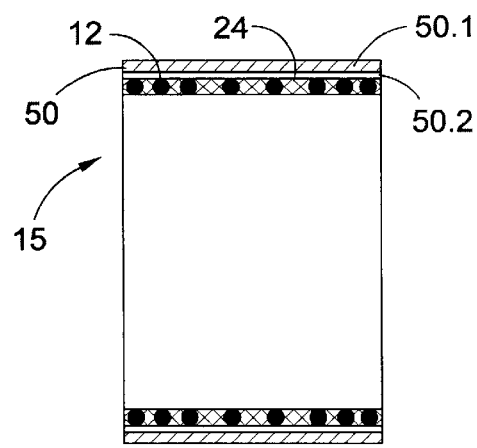
FIG. 4 shows a diagrammatic section through a heating band with an insulating device for inner heating.

The heating band 15 represented in FIG. 4 is suitable for so-called inner heating, i.e., on the outside of this inner heating means there is an insulating device 50, which in this exemplary embodiment has a first insulating layer 50.1 and a second insulating layer 50.2.

In FIGS. 1 to 4, the power supply to the heating unit 12 is not shown.

The specific exemplary embodiment of the wall of a heating device 25 which is represented as a detail in FIG. 7 and takes the form of a cylindrical heating cartridge 25 comprises the following layered structure. On the inside there is a cast unit formed as a cast layer 24, cast inside which there is the heating coil 12. However, the individual heating coil cross sections 12 are not completely surrounded by casting compound, so that they protrude outwardly.

The partially cast heating coil 12 is surrounded on the outside by an insulating layer 70, which has the following structure. Adjoining the protruding heating coil elements 12 there is first of all a first wear resistant layer 18, which consists of a titanium alloy with a low coefficient of thermal conductivity. On the first wear resistant layer 18 there is an insulating layer 22, on which in turn there is a second wear resistant layer 16, which surrounds the heating cartridge 25 on the outside and consists of a titanium alloy with a low coefficient of thermal conductivity. The heating coil cross sections are flattened in the region of the cast layer 24 surrounding them.

Preferably, between the heating unit 12 and the insulating device 70 there is a layer of air 14, which additionally increases the insulating effect.

In the following description, identical components bear the same designations and are not explained again.

The heating cartridge 21, diagrammatically represented in FIG. 5, is formed in a way similar to the representation as a detail of the heating cartridge 25 according to FIG. 7, with a layer of air 14 between the heating device 12 and an outer insulating device 60, but the insulating device 60 comprises only an outer wear resistant layer 16, and an inner insulating layer 22, the heating coil 12 having a square profiling.

At the ends, the heating cartridge 21 according to FIG. 5 is sealed off by annular profiles 44, the thickness of which corresponds to the thickness of the cast layer 24, the layer of air 14 and the inner insulating layer 22. Likewise represented diagrammatically in FIG. 5 is a power connection unit 36 to the heating unit 12.

The heating cartridge 23 represented in FIG. 8 differs from the heating cartridge according to FIG. 5 in that the provision of an additional insulating layer of air 14 has been eliminated and the cast layer 24 goes right up to the insulating layer 22, i.e., the heating coil 12 is cast virtually completely with brass.

The diagrammatic detail of the wall of a heating cartridge 2i represented in FIG. 10 has the same layered insulating device 70 as the heating cartridge 25 according to FIG. 7. The heating device 12 has a heating coil with a circular profile, the individual turns being completely surrounded by a cast unit 24 and the insulating device 70 directly adjoining the cast layer 24 on the outside.

The casting compound may consist of brass, copper or other alloys that conduct heat well. The insulating wear resistant layers preferably consist of titanium or titanium alloy, the underside of which has a polished finish. Considered with preference as the material for the insulating layer is ceramic or mica. In addition, an insulating layer may also take the form of a layer of air or a vacuum layer.

The heating cartridges 21, 23, 25, 27 have an inside diameter which is constant throughout, so that they can be applied without any problem onto, for example, a nozzle device used with an injection mold for the processing of thermoplastic materials.

Figure 11:
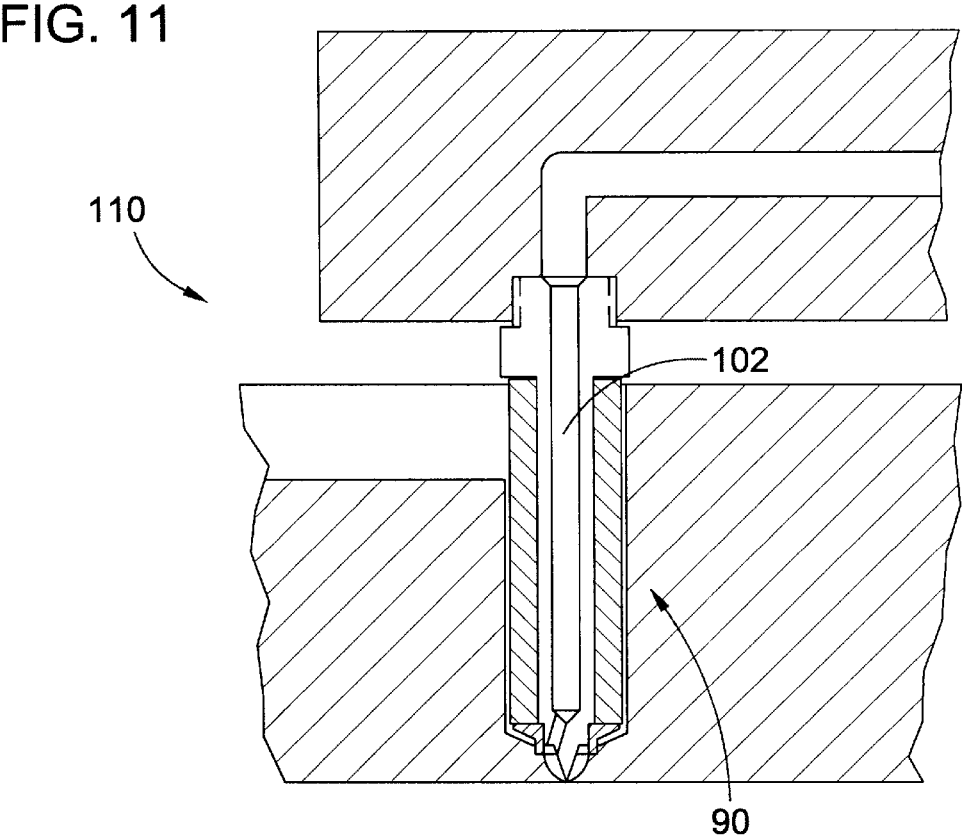
FIG. 11 shows an arrangement of a heating device inside a gating device and FIG. 12 shows a diagrammatic section through a nozzle device with a heating device.

In FIG. 11 it is diagrammatically represented how the heating device 90 according to the invention with the insulating device can be used in a simple way in an encasing manner on a gating device 110 in the region of a nozzle runner 102.

Figure 12:
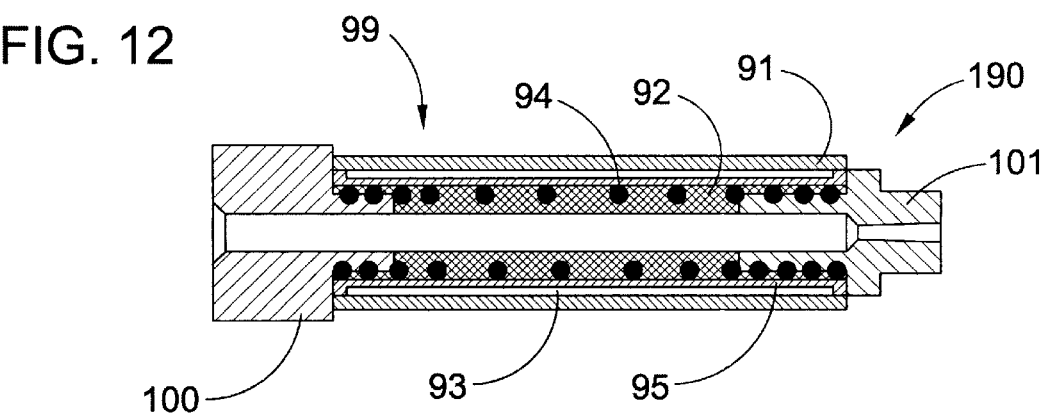

Diagrammatically represented in cross section in FIG. 12 is a nozzle device 190, in which the heating device 99 is present in an integrated form between a nozzle head 100, consisting of special steel, and a nozzle insert 101, consisting of special steel. The nozzle device 190 is designed as a disposable nozzle. The heating device 99 has the following layered structure from inside to outside: brass cast layer 92 with heating coils 94 cast therein, titanium alloy layer 95, mica fill 93 and, finishing off on the outside around the circumference, a titanium alloy layer 91.

Used with preference for producing heating devices is the gravity die casting process, in which brass is preferably used as the casting material for encapsulating the heating coils.

The nozzle device 101 according to FIG. 12 is preferably formed as a "micronozzle", which has length dimensions of about 6 cm and diameter dimensions of about 1 cm.

According to the invention, the heating device is formed as a cylindrical hollow element, the individual layers forming sleeves that are adjacent to one another, at least in certain regions.

I claim:

1. A heating device for use in injection molds for the processing of thermoplastic materials, comprising:
    (a) a hollow housing;
    (b) a heating coil disposed on the housing, said heating coil being adapted to receive a heating current;
    (c) an insulating device surrounding said heating coil, said insulating device having at least one insulating layer, said insulating device having a layered structure, including a wear resistant layer and an insulating layer, said wear resistant layer having a low coefficient of thermal conductivity and being made of one of titanium and a titanium alloy, said insulating layer being made of mica.

2. The heating device as claimed in claim 1, wherein a layer of air is disposed between said insulating device and said heating coil.

3. The heating device as claimed in claim 1, wherein the heating coil is cast with a conducting material.

4. The heating device as claimed in claim 3, wherein said conducting material is brass.

5. The heating device as claimed in claim 1, wherein said insulating device forms the housing of the heating device.

6. An injection mold having one of a hot runner and a heated nozzle for the processing of thermoplastic materials said injection mold comprising at least one heating device that is comprised of:
    (a) a hollow housing;
    (b) a heating coil disposed on the housing, said heating coil being adapted to receive a heating current;
    (c) an insulating device surrounding said heating coil, said insulating device having at least one insulating layer, said insulating device having a layered structure, including a wear resistant layer and an insulating layer, said wear resistant layer having a low coefficient of thermal conductivity and being made of one of titanium and a titanium alloy, said insulating layer being made of mica.

7. A gating device for an injection mold for the processing of thermoplastic materials, wherein the gating device has a heating device that is comprised of:
    (a) a hollow housing;
    (b) a heating coil disposed on the housing, said heating coil being adapted to receive a heating current;
    (c) an insulating device surrounding said heating coil, said insulating device having at least one insulating layer, said insulating device having a layered structure, including a wear resistant layer and an insulating layer, said wear resistant layer having a low coefficient of thermal conductivity and being made of titanium and a titanium alloy, said insulating layer being made of mica.

8. A nozzle device for an injection mold for the processing of thermoplastic materials, wherein the nozzle device has a heating device that is comprised of:
    (a) a hollow housing;
    (b) a heating coil disposed on the housing, said heating coil being adapted to receive a heating current;
    (c) an insulating device surrounding said heating coil, said insulating device having at least one insulating layer, said insulating device having a layered structure, including a wear resistant layer and an insulating layer, said wear resistant layer having a low coefficient of thermal conductivity and being made of one of titanium and a titanium alloy, said insulating layer being made of mica.

* * * * *